(12) United States Patent
Jones et al.

(10) Patent No.: US 8,771,850 B2
(45) Date of Patent: Jul. 8, 2014

(54) CARBON-DEUTERIUM PROTECTIVE OVERCOAT LAYER

(75) Inventors: Paul Max Jones, Palo Alto, CA (US); Christopher Loren Platt, Fremont, CA (US); Emil John Catoc Esmenda, Pleasanton, CA (US); Lang Nhu Dinh, Sacramento, CA (US); Junwei Huang, Fremont, CA (US); James Dillon Kiely, Edina, MN (US)

(73) Assignee: Seagate Technology LLC, Cupertino, CA (US)

( * ) Notice: Subject to any disclaimer, the term of this patent is extended or adjusted under 35 U.S.C. 154(b) by 53 days.

(21) Appl. No.: 13/422,868

(22) Filed: Mar. 16, 2012

(65) Prior Publication Data

US 2013/0244059 A1 Sep. 19, 2013

(51) Int. Cl.
 *G11B 5/66* (2006.01)
(52) U.S. Cl.
 USPC ........................................ 428/835; 428/835.2
(58) Field of Classification Search
 None
 See application file for complete search history.

(56) References Cited

U.S. PATENT DOCUMENTS

| | | | |
|---|---|---|---|
| 6,349,076 B1 | 2/2002 | Chen | |
| 6,483,784 B1 | 11/2002 | Nakatani et al. | |
| 6,521,977 B1 | 2/2003 | Burnham et al. | |
| 6,576,095 B2 | 6/2003 | Chen | |
| 6,636,477 B1 | 10/2003 | Miyamoto et al. | |
| 7,440,384 B2 | 10/2008 | Eppler | |
| 7,652,430 B1 | 1/2010 | Delgado | |
| 7,862,914 B2 | 1/2011 | Kubota et al. | |
| 2006/0099461 A1 | 5/2006 | Jones et al. | |
| 2007/0026263 A1* | 2/2007 | Kubota et al. | 428/832 |
| 2010/0203339 A1 | 8/2010 | Eryilmaz et al. | |
| 2011/0205665 A1 | 8/2011 | Jones et al. | |

OTHER PUBLICATIONS

M.E.H. Maia da Costa et al., "Deuterated amorphous carbon films: Film growth and properties", Surface & Coatings Technology, vol. 204, 2010, pp. 1993-1996.*

Adrian Stoica et al., Propeties of modified amorphous carbon thin films deposited by PECVD, Chem. Listy, vol. 106, 2012, pp. s1499-s1503.*

Mathis et al., "Deuterated Diamond Like Carbon films (DDLC): Mechanical properties in relation to microstructure", Surface & Coatings Technology, vol. 202, 2008, pp. 2349-2353.*

* cited by examiner

*Primary Examiner* — Holly Rickman
(74) *Attorney, Agent, or Firm* — Hall Estill Attorneys at Law

(57) ABSTRACT

A substrate having a carbon-deuterium protective overcoat layer, and method for making the same. In some embodiments, the substrate includes a recording structure having a magnetic recording layer. A protective overcoat layer is Formed on the recording structure, the protective overcoat layer composed of carbon-carbon (C—C) and carbon-deuterium (C-D) bonds and having no carbon-hydrogen (C—H) bonds.

20 Claims, 4 Drawing Sheets

CARBON-DEUTERIUM PROTECTIVE OVERCOAT LAYER

SUMMARY

Various embodiments of the present invention are generally directed to a substrate having a carbon-deuterium protective overcoat layer, and method for making the same.

In some embodiments, a substrate comprises a recording structure having a magnetic recording layer. A protective overcoat layer is contactingly provided on the recording structure, the protective overcoat layer composed of carbon-carbon (C—C) and carbon-deuterium (C-D) bonds and having no carbon-hydrogen (C—H) bonds.

These and other features and advantages which may characterize various embodiments can be understood in view of the following detailed discussion and the accompanying drawings.

DETAILED DESCRIPTION

Figure 1:
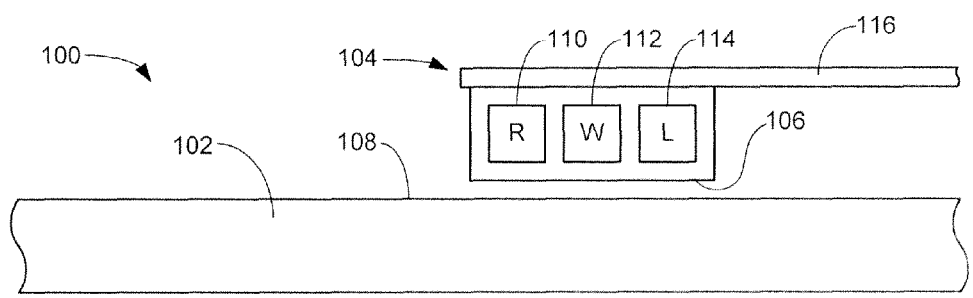
FIG. 1 illustrates a data transducer that uses heat assisted magnetic recording (HAMR) to store data to a magnetic recording medium in accordance with some embodiments.

The present disclosure generally relates to a substrate such as a data recording medium having a protective overcoat layer, and associated method for making the same.

Heat assisted magnetic recording (HAMR) refers to a type of data recording in which localized heat is applied to a recording medium during the writing of data such as in a magnetic or optical form. The localized heating raises the temperature to a level sufficient to reduce the magnetic coercivity (i.e., resistance to change in magnetic orientation) of a recording layer of the medium, thereby enabling an applied write field to more easily change the magnetization state of the recording layer.

Some HAMR systems use a high powered laser which directs a focused laser beam onto the top surface of the medium, and an adjacent write coil which applies a magnetic field which passes through the top surface and into the interior recording layer. In this way, the magnetic coercivity of the medium at normal ambient temperatures can be much higher than the coercivity during recording. This can enhance the stability of the recorded bits and can facilitate significantly higher bit recording densities.

A hard protective overcoat layer is often applied to the top surface of the recording medium. The overcoat layer protects the underlying recording structure from corrosion and other environmental effects such as wear due to contact between the medium and the data transducer. A thin layer of lubricant may be applied to the protective overcoat layer as desired.

Some protective overcoat layers are formed using ion beam deposition techniques in which a hydrocarbon feed gas is cracked by a plasma-enhanced process to form ionic and neutral particles that are deposited to form a carbon overcoat (COC) film. Such a COC film will include both carbon-carbon (C—C) and carbon-hydrogen (C—H) bonds. It has been found that the C—H bonds are weaker than the C—C bonds, and so the C—H bonds will tend to fail before the C—C bonds, particularly in the presence of environmental stresses such as the higher thermal gradients utilized by HAMR systems.

Hydrocarbon based COC films are substantially amorphous in structure, with C—C and C—H bonds located within local sp2 or sp3 coordinated sites. Upon the addition of heat, a common failure pathway proceeds through the rupture C—H bonds, concomitant loss of hydrogen, and the rearrangement of the carbon bonds. Degradation modes include graphitization, oxidation, texturization and thickness reduction (e.g., film loss).

Accordingly, various embodiments are generally directed to a substrate structure and method for forming the same. As explained below, the structure generally includes a COC film formed from carbon and deuterium. A fully deuterated form of the deposition gas results in carbon-carbon (C—C) and carbon deuterium (C-D) bonds and no C—H bonds) in the COC film with generally the same types of sp2 and sp3 bond configurations generally present in hydrocarbon amorphous carbon based films. Because C-D bonds have been found to be significantly stronger than C—H bonds, the deuterium based COC film as disclosed herein exhibits superior performance with a significantly lower failure rate, particularly when used in a HAMR environment.

It will be recognized that the term "hydrogen," strictly speaking, refers to a class of single-electron atoms having two stable isotopes: protium (hydrogen-1 or $^1$H) and deuterium (hydrogen-2 or $^2$H). For purposes herein, the term "hydrogen" and the symbol "H" will be used to describe the first isotope with one proton, no neutrons and one electron. The term "deuterium" and the symbol "D" will refer to the second isotope with one proton, one neutron and one electron. Hydrogen (H) is naturally abundant at a far greater rate than deuterium (D), with an estimated occurrence ratio on earth of about 6,420 H atoms for each D atom.

These and other features of various embodiments can he understood beginning with a review of FIG. 1, which represents aspects of an exemplary data storage system 100. The system 100 includes a rotatable data recording medium 102 and an adjacent data transducer 104. The data transducer 104 is characterized as employing heat assisted magnetic recording (HAMR), although such is merely exemplary and not limiting.

Generally, the medium 102 and the transducer 104 may be incorporated into a hard disc drive (HDD) or other data storage device in which multiple axially arranged recording media (discs) and HAMR data transducers are used to read and write user data from a host device.

In some embodiments, the data are stored on the medium 102 along a number of concentric tracks (not shown) defined along a surface 106 of the medium. The data may be stored in the form of addressable user data sectors of fixed size along the tracks. Hydrodynamic features (such as an air hearing surface 108) may be provisioned on a facing surface of the transducer 104 to enable the transducer to be fluidically supported in close proximity to the medium surface 106 by atmospheric currents established during rotation of the medium 102.

The data transducer 104 is shown to include respective read (R), write (W) and light source (L) elements 110, 112 and 114. The read element 110 may take the form of a magnetoresistive (MR) sensor. The write element 112 may include a write coil and one or more magnetically permeable cores. The light source 114 may take the form of a laser diode or other radiation beam source.

During a read operation, the read element 110 operates to sense a magnetization sequence written to the medium 102 along a portion of a selected track. During a write operation, the light source element 114 projects a high powered irradiation "dot" on the rotating medium 102 to locally increase the temperature of the medium, and the write element 112 directs magnetic flux into the heated portions of the medium to write a desired magnetization sequence. The transducer 104 is supported by an actuator arm 116, which, responsive to a servo control system (not shown), radially positions the respective elements 110, 112 and 114 adjacent the disc surface 106 as required.

Figure 2:
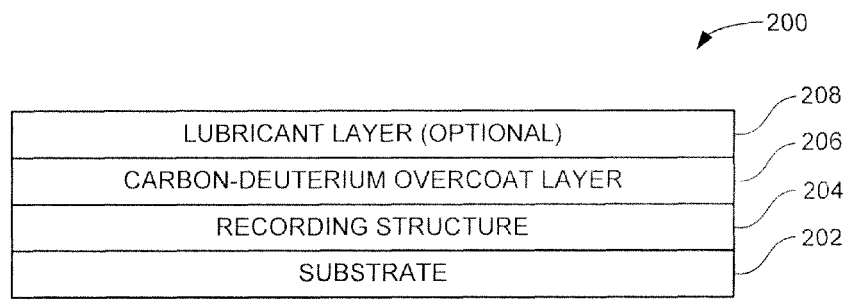
FIG. 2 is a strata representation of the magnetic recording medium of FIG. 1 in accordance with some embodiments.

FIG. 2 is a schematic depiction of various layers of an exemplary substrate in accordance with some embodiments. The structure may be characterized as a recording medium 202 useful in a data storage system such as described above in FIG. 1. Other substrate configurations can readily be used. It will be appreciated that FIG. 2 is functional in nature and is not drawn to scale, so that each of the respective layers shown in FIG. 2 may have its own respective thickness.

A base substrate 204 provides mechanical support for the medium 202. The base substrate 204 may be formed of a suitable rigid material such as metal, ceramic or glass. A recording structure 206 is formed on the base substrate 204. The recording structure 206 operates to store data from a transducer such as the transducer 104 in FIG. 1. The exemplary recording structure 206 may include a number of layers, including at least one recording layer with a relatively high magnetic coercivity adapted to store a magnetic sequence. Heat sink and return layers may also be included in the recording structure. As used herein, the term "recording structure" will be understood to not include a protective overcoat layer, such as a thin film hydrocarbon coating.

A carbon-deuterium (C-D) protective overcoat layer is represented at 208. The overcoat layer 208 is formed directly on the recording structure 206 and operates) protect the recording structure from various environmental stresses such as corrosion and wear. The protective overcoat layer 208 may be configured to have a relatively low coefficient of friction. An optional lubricant layer 210 may be applied to the top surface of the protective overcoat layer 208. The lubricant layer 210 may be a thin layer of perfluorpolyether (PFPE) or similar material.

Figure 3:
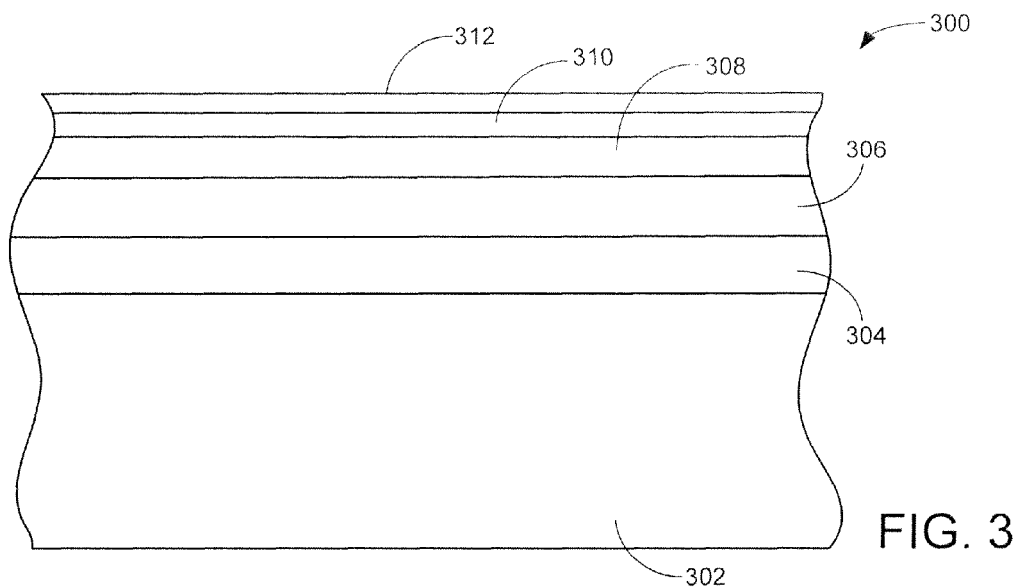
FIG. 3 shows a cross-sectional elevational view of the magnetic recording medium of FIG. 1 in accordance with some embodiments.

FIG. 3 is a cross-sectional elevational representation of another magnetic recording medium 302 in accordance with some embodiments. As before, the medium 302 can be used in the recording system 100 of FIG. 1, although such is not limiting. The medium 302 is shown to include a base substrate 304, a magnetically permeable return layer 306, a non-magnetic heat sink layer 308, a ferromagnetic recording layer 310, a carbon-deuterium (C-D) protective overcoat layer 312, and an optional lubricant layer 314. The return layer 306, heat sink layer 308 and recording layer 310 form a recording structure. Other configurations can readily be utilized.

Figure 4:
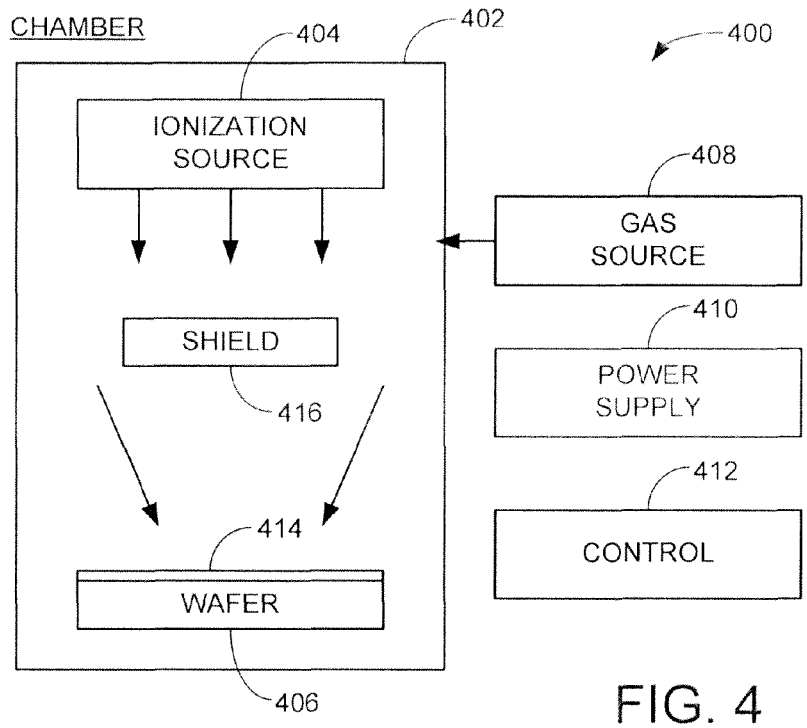
FIG. 4 shows an ion beam deposition system useful in forming the magnetic recording medium of FIG. 1 in accordance with some embodiments.

FIG. 4 shows an ion beam deposition system 400 that may be used to for C-D protective overcoat layers in accordance with some embodiments, such as the protective overcoat layers 206 and 312 discussed above in FIGS. 2-3. Other deposition system configurations may be used so the system of FIG. 4 is merely exemplary and not limiting.

The system 400 includes a vacuum chamber 402 configured to be evacuated and filled with atmospheric fluid as required. The chamber 402 houses an interior ionization source 404. The ionization source 404 generates a plasma-enhanced stream of ions and energetic neutrals for deposition on a target wafer 406. The ionization source 404 may take a variety of forms, such as but not limited to a radio-frequency (RF) inductive or capacitive plasma source, a direct current (DC) arc plasma source, a microwave plasma source, or an electron cyclotron resonance (ECR) plasma source.

A gas source 408 provides a supply of feed gas into the chamber 402. The gas is characterized as fully deuterated gas composed of $C_pD_q$ atoms, where p and q are suitable integers to provide a desired p/q stoichiometry. A power supply 410 supplies electrical power to the ionization source 404. The power supply 410 may further supply a small negative potential to the target wafer 406 on which the film is to be deposited. A control block 412 provides overall process control of the system 400.

During operation, the ionization source 404 applies a voltage to the feed gas, which is composed of carbon (C) and deuterium (D) particles, to form a gas-discharge plasma. The plasma provides ionic and neutral particles which contact the wafer target 406 to form a protective overcoat layer 414 thereon.

In some embodiments, the wafer 406 represents an in-process medium with an exposed recording structure (e.g., a wafer formed of layers 304, 306, 308 and 310 in FIG. 3). In such case, the system 400 operates to construct the protective overcoat layer 414 on a top exposed surface of the recording structure (e.g., the protective overcoat layer 312 shown in FIG. 3).

An optional shield member 416 may be interposed between the ionization source 404 and the wafer 406. The shield 416 is used to divert and regulate the particle flow. In some embodiments, the beam current of the ionization source 404 may be between about 10 milliamps (mA) and 100 mA. The beam voltage may be between about 100 electron volts (eV) and 2,000 eV. Other suitable values may be used. Generally, the process will be controlled such as to promote efficient growth of the desired amorphous film in a uniform manner while reducing the formation of unwanted species.

It is contemplated that the completed film 414 will be nominally uniform in thickness. Exemplary thicknesses may range from about 0.5 nanometers (nm) to upwards of 5.0 nm or more. Any suitable thickness can be used depending on the requirements of a given application. Due to the enhanced strength of the carbon-deuterium bonds, a thinner structure may be able to be used as compared to hydrocarbon based COC films ("C—H COC films"). Moreover, depending on process factors, the C-D COC film may have the same, or lower, friction coefficient characteristics as compared to a C—H COC film.

A film deposited in the above manner will be composed of C—C and C-D bonds. A typical C—H bond may have a bond strength on the order of about 105 kcal/mole. The C—D bond strength may be on the order of 5-10 kcal/mole greater (or more) than the bond strength of a C—H bond. This increase in bond strength has been found to provide a dramatic effect on the rate of film failure, particularly in the range of HAMR writing temperatures, which can be on the order of 350° C. or more.

Figure 5:
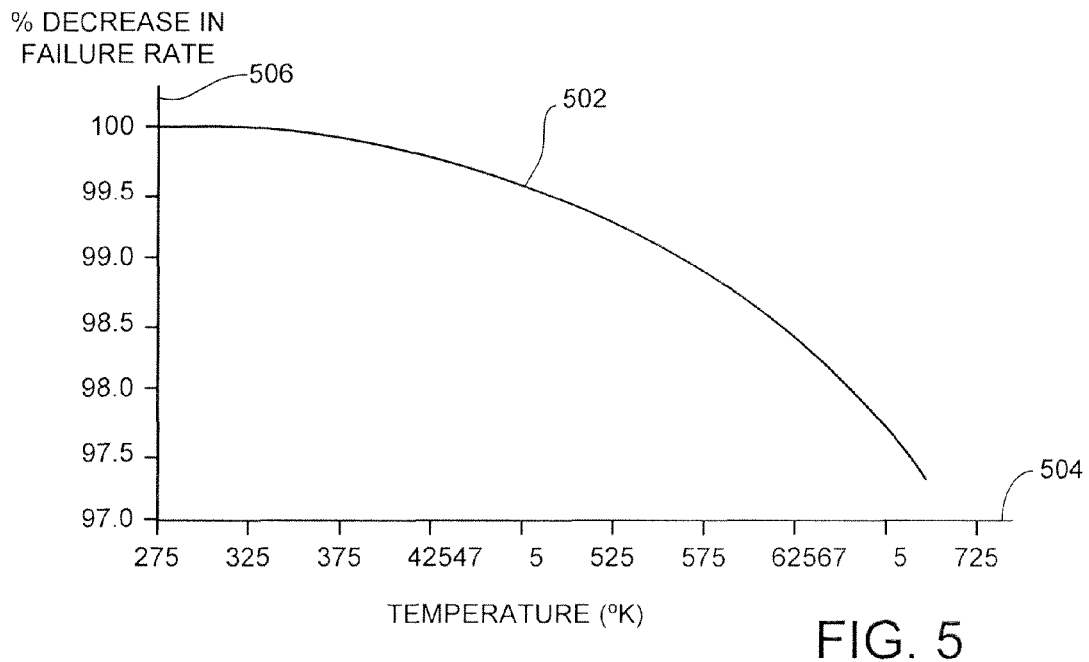
FIG. 5 graphically illustrates exemplary characteristics that may be achievable by use of the deposition system of FIG. 4.

FIG. 5 generally illustrates experimental data relating to decreases in film failure rate as a function of temperature for C-D films as compared to C—H films. Curve 502 is a failure rate differential curve, plotted against a temperature x-axis 504 and a percentage decrease y-axis 506. A 100% decrease in the rate corresponds to no film failure. Even at exceedingly high HAMR recording temperatures, the failure rate was found to be decreased by about 98%, meaning that the observed rate of film failure with C-D COC films was just 2% of that with C—H COC films. This translates to a conservative reduction in failure rate of about fifty times (50×) over hydrocarbon based COC films.

Figure 6:
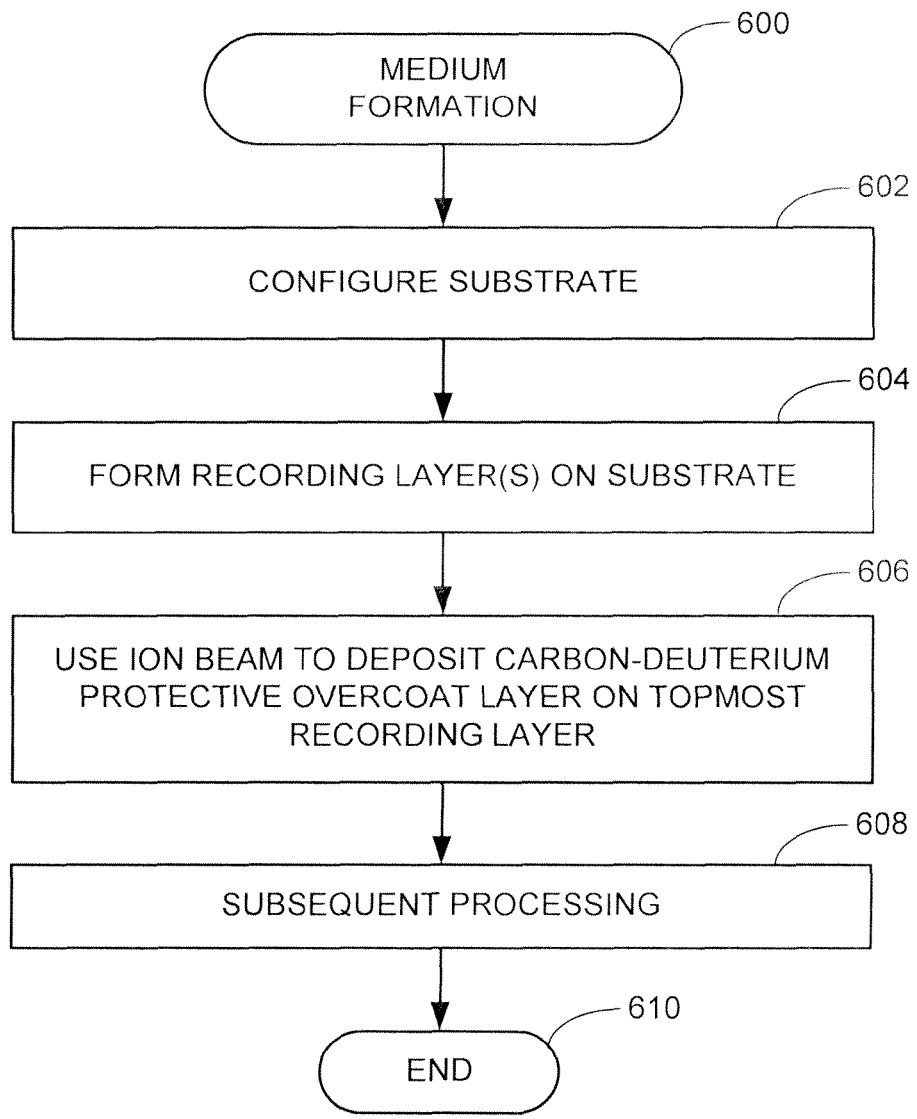
FIG. 6 provides a MEDIUM FORMATION routine generally illustrative of steps carried out in accordance with some embodiments.

FIG. 6 provides a flow chart for an exemplary MEDIA FORMATION routine 600 to generally summarize the foregoing steps discussed above. The routine includes steps of providing a base substrate (such as 304 in FIG. 3) at step 602, and forming a recording structure thereon (such as 306, 308 and 310 in FIG. 3) thereon at step 604.

An ion beam is used at step 606 to deposit a carbon-deuterium protective overcoat layer (such as 312 in FIG. 3) on the recording structure. This may be carried out using a system such as 400 in FIG. 4. Subsequent processing is applied to the medium at step 608, such as the application of an optional lubricant layer (e.g., layer 314 in FIG. 3). The process then ends at step 610.

It has been found that C-D COC films formed by the routine of FIG. 6 can utilize existing C—H COC film deposition systems, equipment, processes and variables (albeit with a different feed gas). For example, in some embodiments the exemplary system 400 in FIG. 4 can represent a normal system otherwise configured to deposit C—H films with the introduction of a fully deuterated feed gas. Few, if any, system parametric changes are required to convert the system 400 from the deposition of C—H films to C-D films, other than evacuating all hydrogen from the system and injecting a suitable C-D feed gas during operation. This can provide a number of benefits during large scale manufacturing including reduced capital and operational costs, and the maintenance of favorable system throughput rates.

Computer simulations and empirical analyses have generally shown that, in a typical C—H based COC film, the C—H bonds tend to break at the lowest temperature reflective of their bond strength. Due to the loss of hydrogen, significant changes in the carbon-to carbon bond length result having the effects of increasing the reactivity of the remaining film and dramatically increasing the inherent stresses in the film. Since the C-D bonds are significantly more stable than the C—H bonds at HAMR temperatures, this will tend to increase the thermal stability of C-D COC films, and significantly decrease the rate of Film degradation.

A system such as 400 in FIG. 4 was used to form samples that were evaluated to test the foregoing simulations and analyses. Carbon overcoats were deposited on HAMR recording structures in an Intevac NCT carbon station using source gasses of $C_2H_4$ to form C—H COC film samples and $C_2D_4$ to form C-D COC film samples. The starting thickness of the carbon overcoats was determined to be on the order of about 36 angstroms (A) via electron spectroscopy for chemical analysis (ESCA) techniques.

The coated wafers were annealed at 400° C. for about nine (9) seconds in a flowing atmospheric mixture with 20% oxygen ($O_2$) using a rapid thermal processor (RTP). After the RTP treatment, the samples were measured by ESCA to determine the amount of carbon remaining on the wafers. Raman spectroscopy was used to determine the carbon bond changes that occurred as a result of the RTP annealing. The thermal stability of the different carbon overcoats was thereafter compared.

Figure 7:
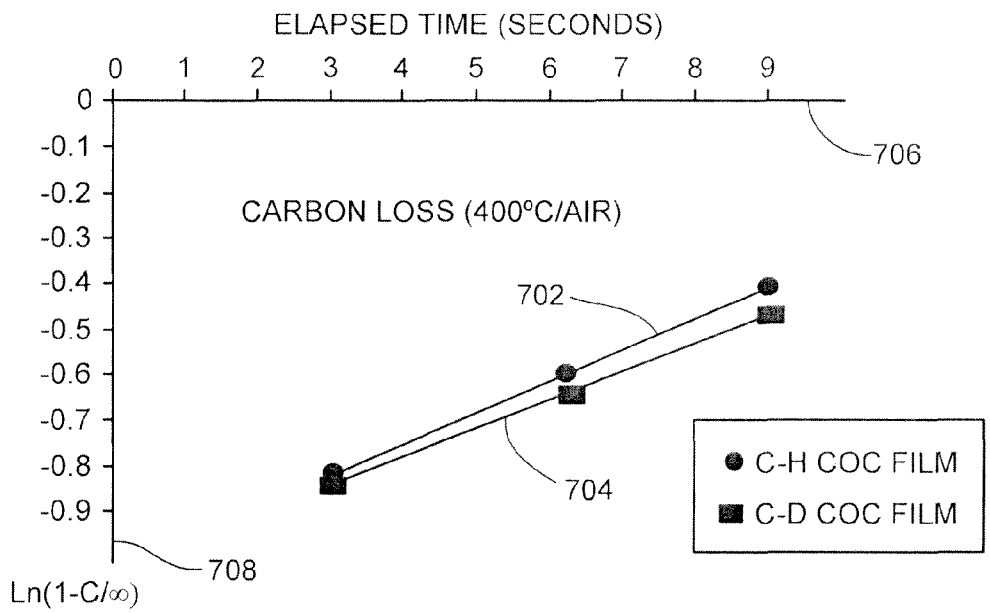
FIG. 7 illustrates exemplary characteristics that may be achievable using the routine of FIG. 6.

FIG. 7 generally represents the results of ESCA carbon C(1s) peak area measurements after RTP annealing (400° C. in air). Curve 702 represents the carbon loss profile for the C—H COC film samples, and curve 704 represents the carbon loss profile for the C-D COC samples. The curves 702, 704 are plotted against a linear x-axis (elapsed time) 706 and a logarithmic (thickness loss) y-axis 708.

It can be seen that carbon loss generally increases in relation to annealing time. The ESCA C(1s) peak area has an exponential relationship with the true thickness of the carbon overcoat thin film. Without calculating the thickness of the carbon exactly, the loss rate of carbon can be determined from the change in C(1s) peak area with increasing RTP exposure time. Using this method, the $C_2H_4$ steady state carbon loss rate was about 2.4 angstroms per second (A/sec). The $C_2D_4$ steady state carbon loss rate was about 2.2 A/sec, or about 10% lower under these test conditions.

Figure 8:
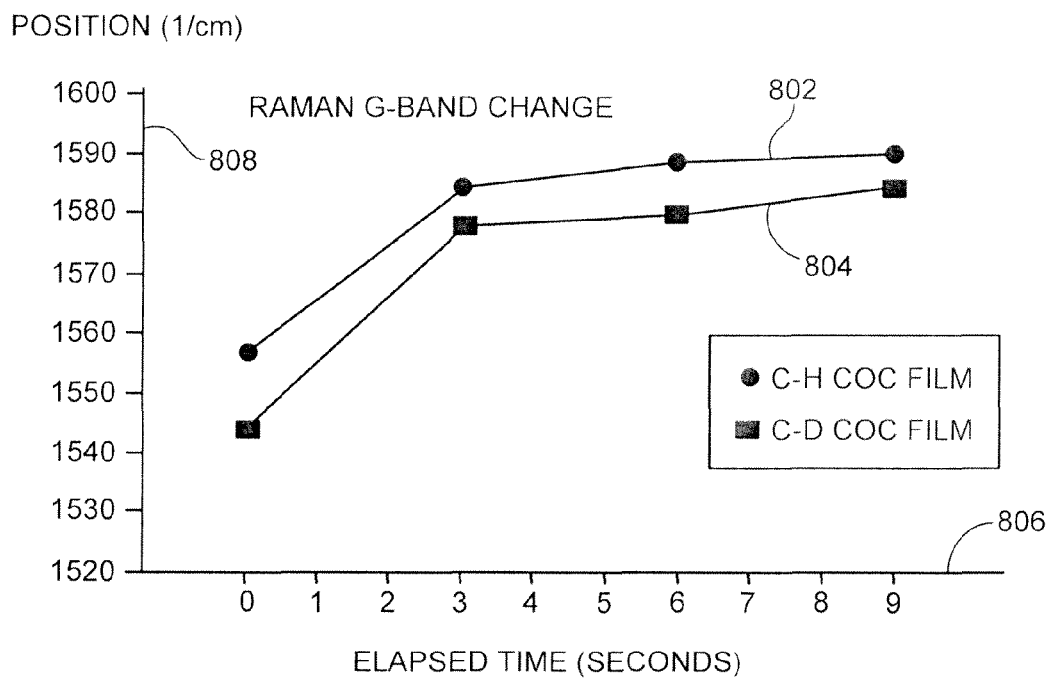
FIG. 8 illustrates further exemplary characteristics that may be achievable using the routine of FIG. 6.

FIG. 8 shows the results from Raman spectroscopy analysis of the samples. Curves 802 and 804 represent detected Raman G-band position as a function of annealing time in the RTP (400° C. in air) for the C—H and C-D COC film samples, respectively. The curves are plotted against an elapsed time x-axis 806 and a position y-axis 808.

The position of the Raman G peak is consistently lower for the C-D curve 804 as compared to the C—H curve 802, which may be due at least in part to the higher effective mass of the C-D bonds. The G-band peak results from the in-plane bond stretching phonon mode and its characteristics reflect the energy and dispersion of the sp2-coordinated bonding sites. For both the $C_2H_4$ and $C_2D_4$ samples, a large shift was seen in the G-band position with RTP anneal. The relative changes were similar for both types or source gas. These data are consistent with the carbon loss data obtained in FIG. 7, and confirm the above simulations that the C-D COC film provides significant structural improvements over a C—H COC film.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. An apparatus, comprising:
  a base substrate;
  a recording structure in contact with the base substrate comprising a magnetic recording layer; and
  a protective overcoat layer in contact with the recording structure, the protective overcoat layer composed of carbon-carbon (C—C) and carbon-deuterium (C-D) bonds and having no carbon-hydrogen (C—H) bonds, the protective overcoat layer comprising $C_2D_4$ and having a bond strength of at least about 110 kcal/mole.

2. The apparatus of claim 1, further comprising a layer of lubricant in contact with the protective overcoat layer on a side opposite the recording structure.

3. The apparatus of claim 1, characterized as a heat assisted magnetic recording (HAMR) recording medium.

4. The apparatus of claim 1, in which the recording structure further comprises a heat sink layer and a magnetically permeable return layer.

5. The apparatus of claim 1, in which the protective overcoat layer is formed by introducing a feed gas into a deposition chamber having an ionization source, the feed gas having a stoichiometry of CpDq, where p is equal to two and q is equal to four.

6. The apparatus of claim 1, in which the protective overcoat layer is formed using a direct current (DC) arc plasma source.

7. The apparatus of claim 1, wherein the protective overcoat layer has a thickness of from about 0.5 nanometers (nm) to about 5.0 nm.

8. The apparatus of claim 5, wherein the protective overcoat layer is further formed by evacuating the chamber prior to introduction of the feed gas so that the chamber is devoid of hydrogen during the deposition of the protective overcoat layer.

9. The apparatus of claim 1, wherein the recording structure comprises a ferromagnetic recording layer of a heat assisted magnetic recording (HAMR) data recording medium, and the protective overcoat layer is formed directly on the recording layer.

10. The apparatus of claim 9, in which the recording structure further comprises a heat sink layer and a magnetically permeable return layer, wherein the heat sink layer is disposed between the recording layer and the return layer.

11. An apparatus comprising a protective overcoat layer supported by a magnetic recording layer, the protective overcoat layer composed of carbon-carbon (C—C) and carbon-deuterium (C-D) bonds with no carbon-hydrogen (C—H) bonds, the protective overcoat layer comprising $C_2D_4$ and having a bond strength of at least about 110 kcal/mole.

12. The apparatus of claim 11, further comprising a substrate which supports the magnetic recording layer.

13. The apparatus of claim 11, further comprising a layer of lubricant in contact with the protective overcoat layer on a side opposite the magnetic recording layer.

14. The apparatus of claim 11, characterized as a heat assisted magnetic recording (HAMR) recording medium.

15. The apparatus of claim 11, further comprising a heat sink layer and a magnetically permeable return layer adjacent the magnetic recording layer on a side opposite the protective overcoat layer.

16. The apparatus of claim 11, in which the protective overcoat layer is formed by introducing a feed gas into a deposition chamber having an ionization source, the feed gas having a stoichiometry of CpDq, where p is equal to two and q is equal to four.

17. The apparatus of claim 11, in which the protective overcoat layer is formed using a direct current (DC) arc plasma source.

18. The apparatus of claim 11, wherein the protective overcoat layer has a thickness of from about 0.5 nanometers (nm) to about 5.0 nm.

19. The apparatus of claim 11, wherein the protective overcoat layer is deposited onto the magnetic recording layer using an ion beam supplied with a current of from about 10 milliamps (mA) to about 100 mA and a voltage of from about 100 electron volts (eV) and about 2,000 eV.

20. The apparatus of claim 11, characterized as a heat assisted magnetic recording (HAMR) recording medium, wherein the protective overcoat layer has an overall thickness of from about 0.5 nanometers (nm) to about 2.5 nm.

* * * * *